J. TIPPETT.
TRAP.
APPLICATION FILED NOV. 15, 1911.
1,026,477.
Patented May 14, 1912.
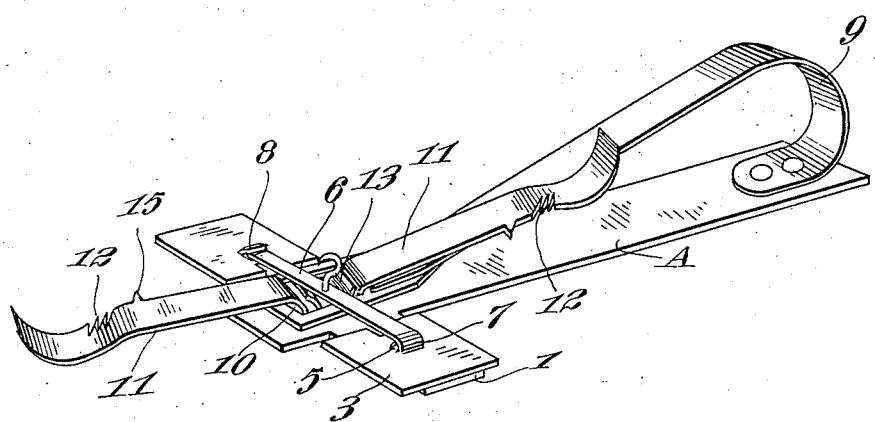
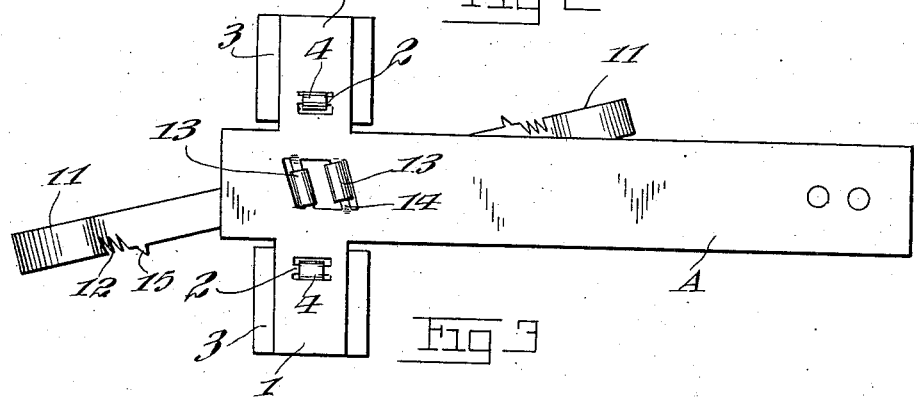
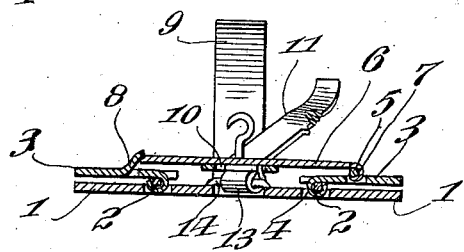
Inventor
John Tippett
By Victor J. Evans
Attorney
Witnesses

UNITED STATES PATENT OFFICE.

JOHN TIPPETT, OF MOGOLLON, NEW MEXICO.

TRAP.

1,026,477.  Specification of Letters Patent.  Patented May 14, 1912.

Application filed November 15, 1911.  Serial No. 660,521.

*To all whom it may concern:*

Be it known that I, JOHN TIPPETT, a citizen of the United States of America, residing at Mogollon, in the county of Socorro and State of New Mexico, have invented new and useful Improvements in Traps, of which the following is a specification.

This invention relates to improvements in traps and more particularly to traps for catching large animals such as bears and the like.

In carrying out the present invention, it is my purpose to provide a trap of this character whereby an animal may be caught and securely held, the jaws of the trap being constructed in such a manner as to retain the animal in their embrace when the said jaws have been operated.

A further object of this invention is to provide a trap of the above character, in which trigger plates shall be mounted at each side of the base and connected thereto for pivotal movement whereby upon the operation of the plates the trigger will be released to effect the operation of the jaws.

With the above and other objects in view the invention consists in the construction, combination and arrangement of parts hereinafter described, claimed, and illustrated in the accompanying drawings wherein is shown the preferred embodiment of the invention, and wherein:

Figure 1 is a perspective view of a trap constructed in accordance with the present invention. Fig. 2 is a bottom plan view of the same, and Fig. 3 is a transverse section through the trigger mechanism.

Similar reference characters designate like parts throughout the several views.

Referring more particularly to the accompanying drawings A designates the base of a trap constructed of metal or any other suitable material and provided adjacent one end with oppositely disposed laterally projecting feet 1, which latter are preferably formed integral with the base and serve to securely hold the same in an operative position. Each of the feet 1 has struck up therefrom a pintle 2 to which is pivotally connected a trigger actuating plate 3 which latter has a portion at one side and intermediate its length cut out and bent upon itself to form an eye 4 adapted to receive the pintle 2 whereby the trigger actuating plates may be pivoted to the feet 1. One of the trigger actuating plates 3 has, preferably struck up therefrom, a pintle 5 to which is pivotally connected one end of a trigger 6, the pivoted end of the trigger being bent upon itself to provide an eye 7 to receive the pintle 5. Struck up from the opposite plate 3 is a tongue 8 designed to be engaged by the free end of the trigger 6 in the setting of the trap.

The opposite end of the base A has fixed thereto a spring 9, the free end of which is provided with a slot 10 designed to receive and operate the jaws 11 of the trap upon the release of the trigger.

The jaws 11 comprise elongated metallic strips or bars curved toward each other at their upper ends and adapted to form a substantially oval opening in the operation of the trap whereby the animal may be retained between the jaw members. Each of the jaw members 11 is provided upon opposite sides with spurs or prongs 12 designed to bite into the animal in the event of his trying to release himself. The opposite ends of the jaw members 11 are bent upon themselves to provide eyes 13 adapted to engage pintles 14 which latter are preferably struck up from the base A of the trap intermediate the width of the said base between the feet 1.

To set the trap, the spring 9 is first pressed downward upon the base A, and the jaws 11 spread apart as illustrated in Fig. 1 of the drawing, after which the trigger plates 3 are given a slight pivotal movement upon their pintles so that the trigger 6 may be swung on its pintle and engaged under the tongue 8. In this position of the plates it will be seen that the spring 9 is held inoperative by reason of the connection between the trigger actuating plates.

From this construction it will be seen that the trap may be operated from either side, and when an animal steps upon one of the plates 3, the trigger will be disengaged from the tongue 8 whereby the spring 9 will move in an upward direction thereby closing the jaws around the animal.

A lug 15 is formed upon each of the jaw members preferably below the spurs 12 to limit the upward movement of the spring. The trigger 6 intermediate its length is provided with a hook or other suitable bait holding device.

Having thus described my invention what I claim and desire to secure by Letters-Patent is:

1. A trap of the class described comprising a base, feet formed integral with the base and projecting laterally therefrom, jaw members pivoted to the base, a spring fixed to the base and adapted to operate said jaw members, trigger actuating plates pivoted upon said feet, a trigger pivoted to one of said plates and adapted to hold said jaws in open position, and means carried by the other of said plates to hold the trigger against the action of the spring.

2. A trap of the class described comprising a base, a foot projecting laterally from each side of the base, a trigger actuating plate pivoted upon each foot, a pair of jaws pivoted upon the base, a spring for operating said jaws, and a trigger mounted upon one of said plates and adapted to be engaged by the other of said plates to hold the jaws in open position.

In testimony whereof I affix my signature in presence of two witnesses.

JOHN TIPPETT.

Witnesses:
E. T. BURNS,
C. B. CLARK.

Copies of this patent may be obtained for five cents each, by addressing the "Commissioner of Patents, Washington, D. C."